(12) United States Patent
Alverson et al.

(10) Patent No.: US 8,302,092 B2
(45) Date of Patent: Oct. 30, 2012

(54) EXTENSIBLE DATA DRIVEN DEPLOYMENT SYSTEM

(75) Inventors: Kenneth Lloyd Alverson, Redmond, WA (US); Nirav Kamdar, Redmond, WA (US); Steven Richie Wood, Kirkland, WA (US); Cezar Ungureanasu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1495 days.

(21) Appl. No.: 11/768,256

(22) Filed: Jun. 26, 2007

(65) Prior Publication Data

US 2009/0007095 A1 Jan. 1, 2009

(51) Int. Cl.
*G06F 9/445* (2006.01)

(52) U.S. Cl. .......................... 717/177; 717/176

(58) Field of Classification Search .................. 717/176, 717/177
See application file for complete search history.

(56) References Cited

U.S. PATENT DOCUMENTS

| | | | |
|---|---|---|---|
| 6,721,777 B1 * | 4/2004 | Sharma .................... | 718/101 |
| 6,892,382 B1 * | 5/2005 | Hapner et al. ............ | 717/174 |
| 6,986,135 B2 | 1/2006 | Leathers et al. | |
| 7,069,553 B2 * | 6/2006 | Narayanaswamy et al. .. | 717/173 |
| 7,155,380 B2 | 12/2006 | Hunt et al. | |
| 7,210,143 B2 | 4/2007 | Or et al. | |
| 7,487,513 B1 * | 2/2009 | Savchenko et al. ......... | 719/320 |
| 7,506,327 B2 * | 3/2009 | Kovacs et al. ............. | 717/144 |
| 7,694,140 B1 * | 4/2010 | Sachenko et al. ........... | 713/170 |
| 7,716,665 B2 * | 5/2010 | Buehler et al. ............. | 717/175 |
| 7,770,151 B2 * | 8/2010 | Sanjar et al. ............... | 717/109 |
| 8,037,471 B2 * | 10/2011 | Keller et al. ................ | 717/174 |
| 2003/0167456 A1 | 9/2003 | Sabharwal | |
| 2004/0158585 A1 | 8/2004 | Kovacs et al. | |
| 2004/0205179 A1 | 10/2004 | Hunt et al. | |
| 2005/0289536 A1 * | 12/2005 | Nayak et al. ................ | 717/174 |
| 2006/0004856 A1 | 1/2006 | Shen et al. | |
| 2006/0015816 A1 | 1/2006 | Kuehner et al. | |
| 2006/0026591 A1 * | 2/2006 | Backhouse et al. .......... | 717/177 |
| 2006/0041643 A1 | 2/2006 | Fanshier | |
| 2006/0053087 A1 * | 3/2006 | Pavlov ....................... | 707/1 |
| 2006/0080413 A1 | 4/2006 | Oprea et al. | |
| 2007/0088707 A1 | 4/2007 | Durgin et al. | |
| 2007/0156756 A1 * | 7/2007 | Stoyanova ................... | 707/104.1 |

OTHER PUBLICATIONS

Frenot et al., "EJB components Migration Service and Automatic Deployment", Jun. 2002.*
Oberle et al., "Semantic Management of Distributed Web Application", IEEE, vol. 7, No. 5, May 2006.*
Brown et al., "A Model of Configuration Complexity and its Application to a Change Management System", 2005.*
Rikki Kirzner. Dynamic Data-Driven Enterprise Application Development Using Scalable Vector Graphics. Jun. 2003. http://archive.nmc.org/projects/horizon/Corel%20White%20Paper.pdf.
Capabilities of Atlas Pro. Acsel. Agency Consortium for Secure E-Learning. http://www.usalearning.gov/documents/Atlas_Pro_Technical_White_Paper.doc. Last accessed May 3, 2007.
Federica Paganelli. A Model-Driven Method for the Design and Deployment of Web-Based Document Management Systems. Journal of Digital Information, vol. 6 Issue 3. Jun. 30, 2005. http://jodi.tamu.edu/Articles/v06/i03/Paganelli/.

* cited by examiner

*Primary Examiner* — Phillip H Nguyen (57) ABSTRACT

Systems and methods that facilitate deployment of server applications via employing a deployment system that declaratively defines deployment actions. Such system is extensible to enable user customization, and includes a deployment document that declaratively defines deployment terms. The deployment document can further describe what the tasks accomplish, and also what tasks are to be forwarded to the task handler at execution time.

20 Claims, 10 Drawing Sheets

EXTENSIBLE DATA DRIVEN DEPLOYMENT SYSTEM

BACKGROUND

Advent of a global communications network such as the Internet has facilitated exchange of enormous amounts of information. Additionally, costs associated with storage and maintenance of such information has declined, resulting in massive data storage structures. Moreover, technological advances in computer hardware, software and networking have lead to efficient, cost effective computing systems (e.g., desktop computers, laptops, handhelds, cell phones, servers . . . ) that can communicate with each other from essentially anywhere in the world in order to exchange information. Such systems continue to evolve into more reliable, robust and user-friendly systems.

For example, many industries and consumers are leveraging computing technology to improve efficiency and decrease cost through web-based (e.g., on-line) services. Consumers are now enabled to search and retrieve particular information (e.g., via a search engine), purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms . . . ), etc. with the click of a mouse.

Installation of such software and/or applications can be complex, time-consuming, and costly when the target environment is distributed (e.g., a distributed network, a distributed networked environment, and the like). A distributed network, which is also on the rise based on technological advances, can be a reliable and pervasive high-band network that is arbitrarily distributed (e.g., networked clients) and/or strategically distributed (e.g., networked servers) that can implement software to integrate and manage components associated therewith. Typically, software deployment and installation is a sequential, tedious, and error-prone process. Moreover, errors associated with deployment of software will multiply, since such software is being installed on multiple computers; either sequentially or concurrently within a distributed networked environment. For instance, if an incorrect DNS server name is implemented, such error will be repeated for each machine the software is being installed upon. The ensuing complexity, which is inherent because of the numerous configurations, settings, and information related to a distributed network, typical installations usually require a costly experienced technician to install and tend to take hours or even days to complete.

For example, processes of installing and preparing server products are becoming increasingly complex. Typically, products have a plurality of interconnected modules or roles, wherein some can coexist together, while others are mutually exclusive. Moreover, many of such server products have diverse prerequisite conditions for installation. Accordingly, tasks associated with obtaining a functional product require more than simply loading the software, as such tasks have corresponding dependencies associated therewith.

Moreover, logic required to manage dependencies is substantially implemented in code. Nonetheless, such coding is typically error prone and time consuming to update, and if change is required, the entire product often needs to be re-compiled and re-built in order to accommodate such change. Additionally, the User Interface (UT) needed to present the modules and tasks to users have to be adjusted and re-built, which can have a cascading effect of generating more work for administrators, localization teams, and the like.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation facilitates deployment of server applications via employing a deployment system that declaratively defines deployment actions or dependencies, and can be readily edited (e.g., by software authors, non-technical administrators, and the like—to enable customization.) The deployment system includes a deployment document that declaratively defines deployment terms—such as in form of an external XML that is editable to accommodate changing deployment requirements—and further generates corresponding User Interfaces with associated displays for tasks. Such deployment document can further describe what the tasks accomplish, and what tasks are to be performed by the task handler at execution time. This can further include instructions to install a product, perform an action, execute a wizard and the like. The deployment document can further describe state of tasks and their relation to state predicates (e.g., a function or expression that has a Boolean result such as true or false.) For example, the activation task indicates unavailability until product installation. In a related aspect, in addition to packaging the XML and employing it at compile time, the XML can be opened to enable users to customize based on their proprietary requirements.

Moreover, a deployment engine can be provided, as part of the deployment system that defines deployment terms, related dependencies, sequential order of task and the like—and further describes operations of the tasks. In addition, the deployment engine can determine: which state is required to be checked; whether the requisite conditions have been satisfied (e.g., before execution of product an installation thereof is typically required); and further supply the logic in the system's behavior.

Based on such determination, a rendering component as part of the deployment system can deactivate display of non-allowable tasks (e.g., via a change of color for a button to indicate a non-functional state.) The user can then click on tasks that are permissible task; such as checking availability of install links during an installation. The deployment engine can then install the product by supplying information to task handlers, which have knowledge of how to install the product. The product can then be installed and the deployment engine can thereafter identify changes that have occurred and track a current state, to perform actions based on the identified change (e.g., installation of additional products, check for new states, and the like). The deployment system can also include a state evaluator component that determines state of the tasks. Such can occur by composing the results of several predicates, wherein the state evaluator also provides a cache to prevent repeated execution of the same predicate.

For example, the deployment document can be analogized to a programming language (e.g., describing the system therein) and the deployment engine is analogized to an interpreter and the state evaluator and the task handler can act as instructions. Accordingly, extensibility of the system becomes possible, and new behavior can be added to the deployment experience, wherein actions and metadata associated therewith can be readily updated.

It is to be appreciated that predicates can also be extensible, wherein new predicates can be added without modifying the core engine. Accordingly, such predicates can be implemented as an external third party module/external code, or declaratively against various parts of the system (e.g., registry entries, or the presence of a directory or file). Hence, tasks (and the states of tasks, where state is a composition of predicates) can be declaratively defined within a deployment scenario, and a requirement for writing a custom code can be mitigated.

According to a methodology of the subject innovation, upon starting the deployment tool, a determination is made as to what should be displayed to a user. A request is made and the deployment document is opened to identify what tasks the deployment document defines. Such information can then be forwarded to a rendering component, wherein the rendering component obtains the XML for a display thereof to the user (in forms of an HTML). In addition, the rendering component displays tasks that are available, and subsequently returns control back to the deployment engine. Next, the deployment engine identifies the available tasks for execution by returning to the deployment document, to requests parts of the document that are relevant to the state of the task(s). Such information is then passed to the state evaluator, which employs the information along with the state check to determine the state of the task. Accordingly, the information is passed back to the deployment engine again, which passes the updated information to the rendering component. For example, if install is disabled then the rendering component typically needs to be informed so the rendering component can display a deactivated button (e.g., gray color.) Such interactions repeat through each task on the page. A user can then interact with the page via a click on a button. Hence, the deployment engine can determine what the user clicked and using the information previously obtained from the deployment document, forwards the requisite information to the task handler for performing the task. A state can then be evaluated based on the task results. Similarly, based on results of the executed task (wherein predicates have potentially changed their value as a result), the states for all tasks can be re-evaluated as required.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
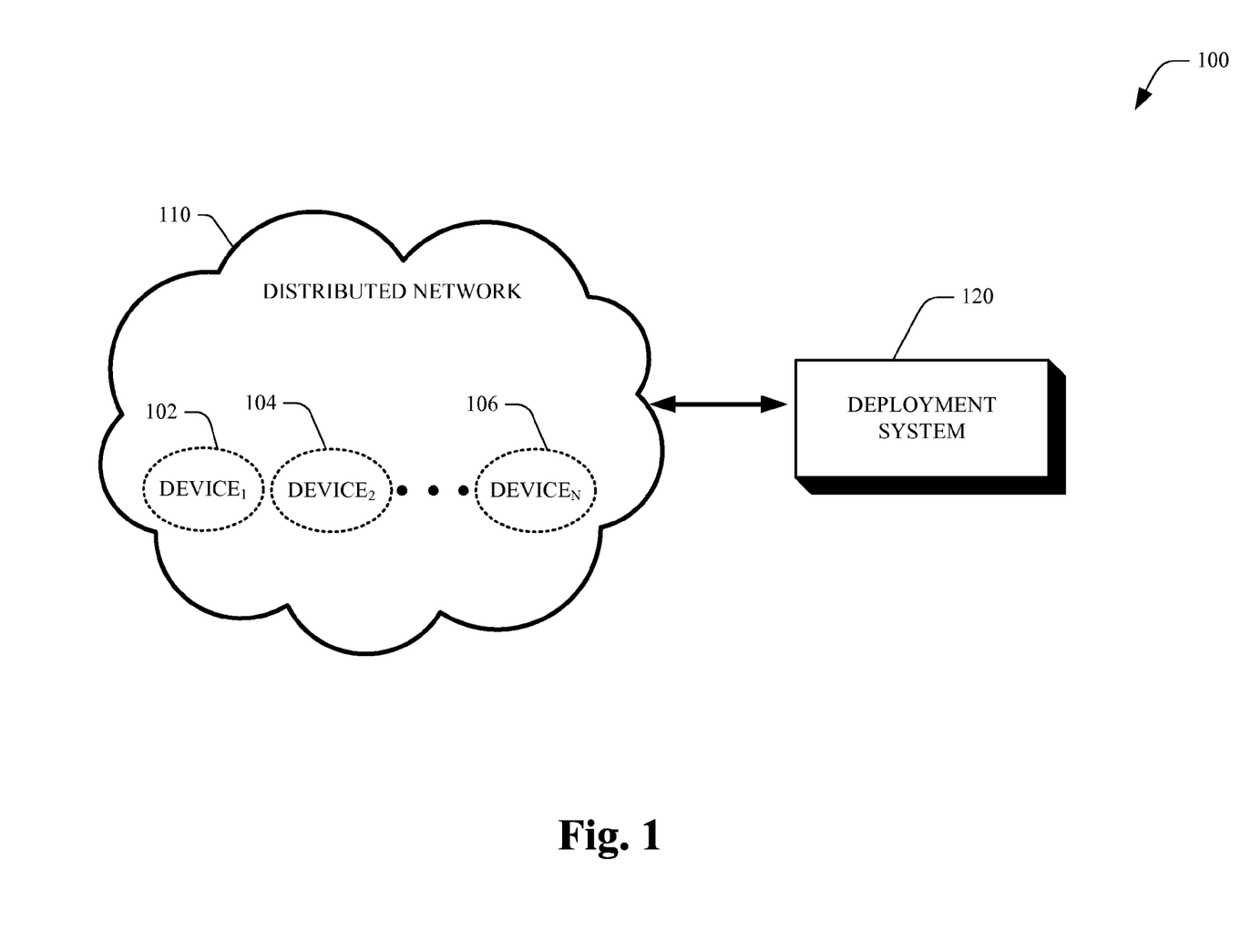
FIG. 1 illustrates an exemplary block diagram of a deployment system in accordance with an aspect of the subject innovation.

FIG. 1 illustrates a block diagram of a system 100 that employs a deployment system 120 that declaratively defines deployment actions. The deployment system 120 can deploy applications and software in a distributed environment 110, such as complicated server applications that span a plurality of machines/devices 102, 104, 106 (1 to N, where N is an integer.) The distributed environment 110 can include various devices such as, workstations, servers, desktops, laptops, firewalls, routers, wireless access points, portable digital assistants (PDAs), tablets, pocket PCs, printers, and the like, for example. Such distributed environment 110 can further include configuration data specific thereto, which can be collected to facilitate installation of the software and/or application. For example, collected data related to the distributed environment can include Internet Protocol address (IP address), DNS server name, network name, network data, device data, topology data, any requisite data related necessary for software deployment, computer name, firewall data, router data, and the like. Moreover, the deployed application can include distributed multi-tier application, an operating system (OS), an active directory software, a line of business application (e.g., customer relation management, accounting, share point), and the like, for example.

The deployment system 120 can declaratively define deployment terms, which can be editable to accommodate changing deployment requirements—and further generates corresponding User Interfaces with associated displays, as described in detail infra. In addition to deploying server applications and associated software, the deployment system 120 can interact with a change management activity, decommissioning an entity and/or device, and the like, wherein a task can also be coordinated across a range of resources that are not limited to hardware/software/service.

Furthermore, various reports can be generated that relate to the automatic deployment of the applications in the distributed network 110. For example, a report can be generated based on the collected data associated with the distributed network 110 to illustrate the various data, settings, configurations, devices, and the like, within or associated with the distributed network 110. Such reports can further illustrate a proposal for a particular distributed network and/or environment, and can relate to a proposed deployment strategy of the software based on particular settings. For example, a report can be generated to provide data related to the complete installation and/or deployment of the software (e.g., final software settings, data associated with deployment, security related data, and the like).

Figure 2:
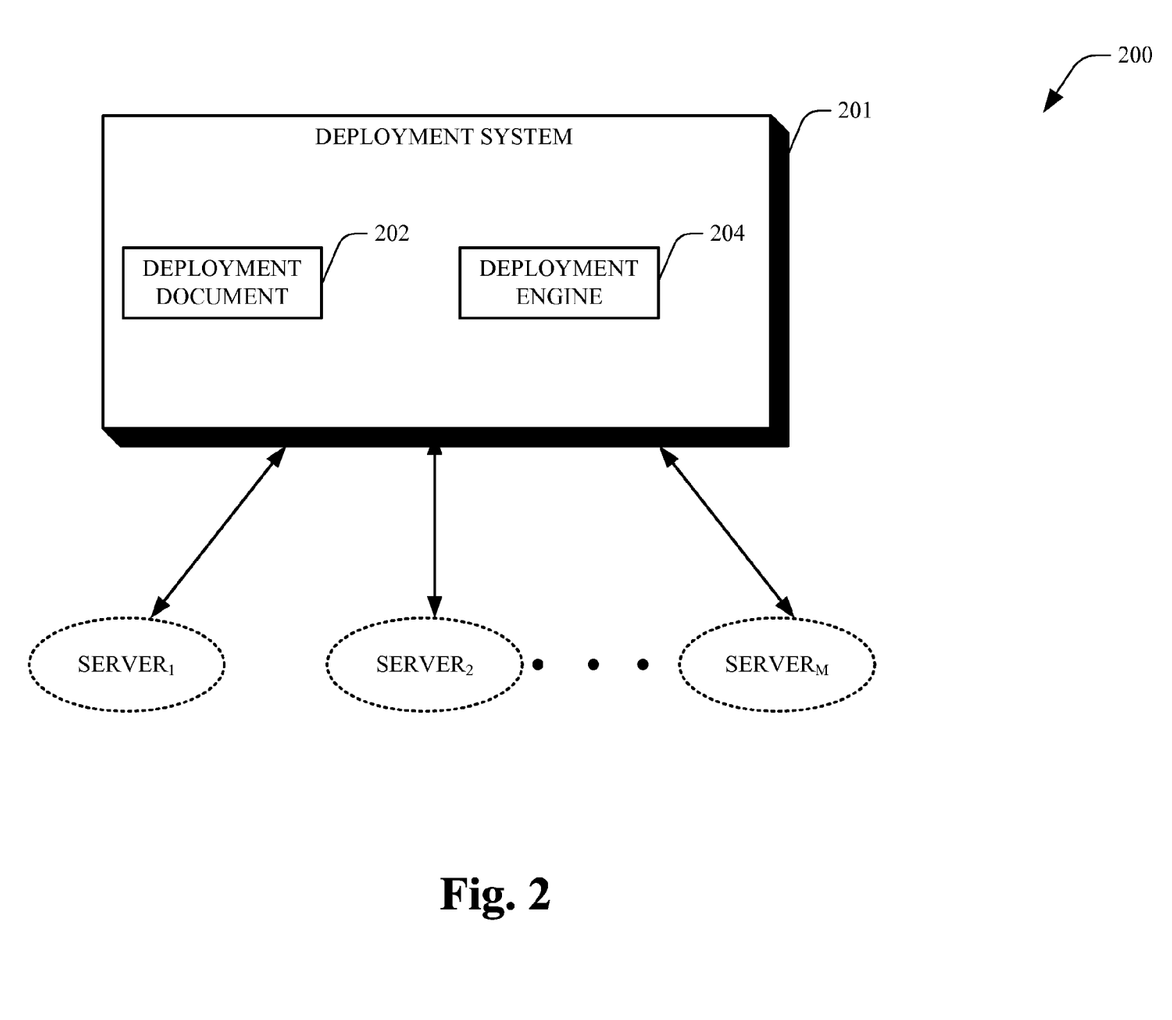
FIG. 2 illustrates a further block diagram of a deployment system that includes a deployment document and a deployment engine.

FIG. 2 illustrates a further block diagram of a deployment system that includes a deployment document 202 and a deployment engine 204, wherein the deployment document 202 declaratively defines deployment terms—such as in form of an external XML that is editable to accommodate changing deployment requirements. Such deployment document 202 can further describe what the tasks accomplish, and at execution time what tasks are to be forwarded to the task handler. This can further include instructions to install a product, perform an action, execute a wizard with sequence of dialogs, and the like. The deployment document 202 can further describe state of tasks and their relation to state predicates, associated with deployment of applications on servers 1 thru M (where M is an integer.) For example, an activation task can indicate unavailability until product installation. In a related aspect, in addition to packaging the XML and employing it at compile time, the XML can be opened to enable users to customize based on their proprietary requirements.

Likewise, the deployment engine 204 can define deployment terms, or related dependencies, or sequential order of task, or operations of the tasks, or a combination thereof. In addition, the deployment engine 204 can determine which state is required to be checked, and whether the requisite conditions have been satisfied (e.g., before execution of product an installation thereof is typically required).

Figure 3:
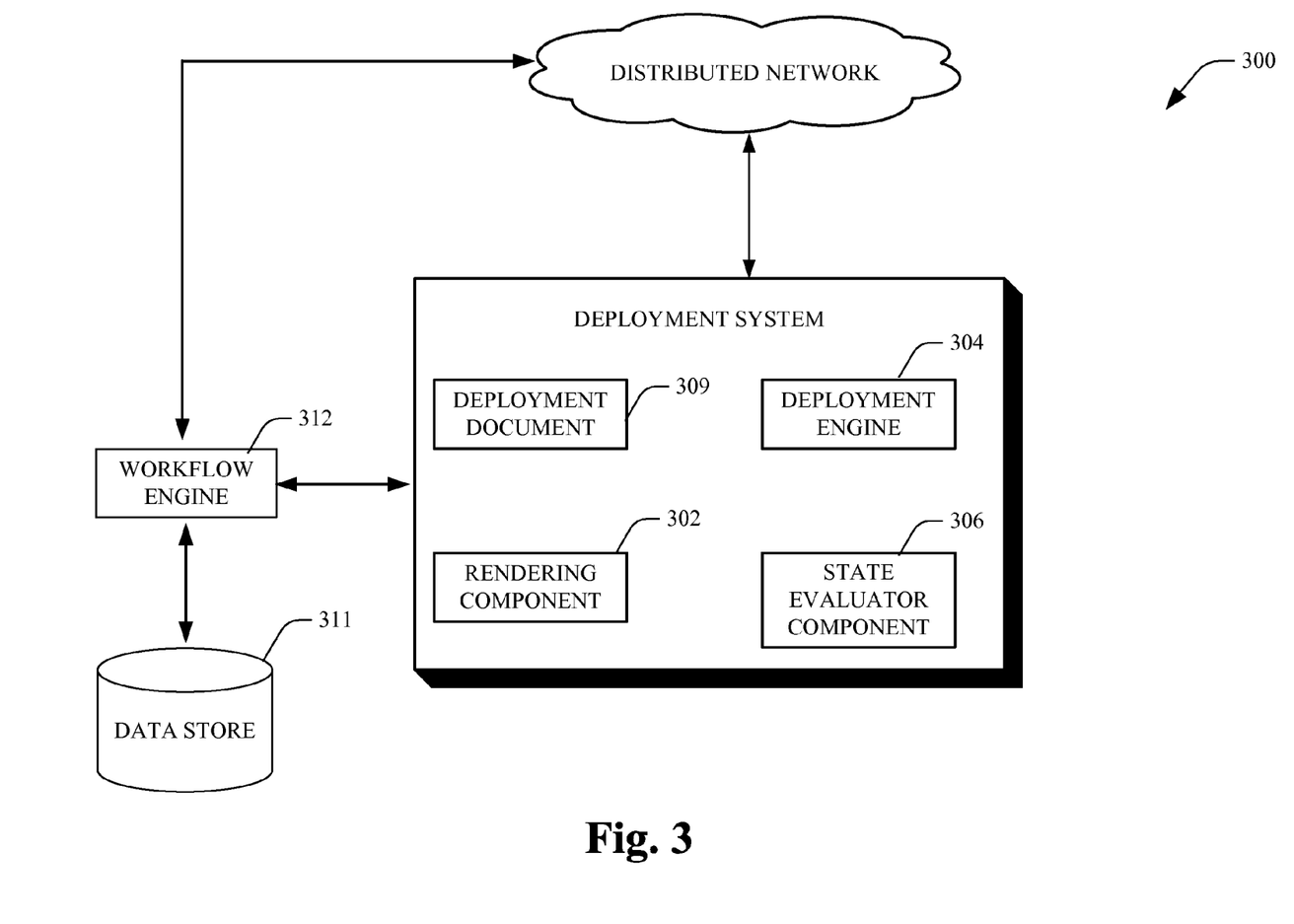
FIG. 3 illustrates a particular block diagram for a rendering component and state evaluator component in accordance with an aspect of the subject innovation.

FIG. 3 illustrates a deployment system 300 in accordance with a particular aspect of the subject innovation, which implements a rendering component 302. Based on the determination performed by the deployment engine 304, the rendering component 302 can deactivate display of non-allowable tasks (e.g., via a change of color for a button to indicate a non-functional state.) The user can then click on tasks that are permissible task such as availability of install links during an installation. The deployment engine 304 can then install the product by supplying information to task handlers, which have knowledge of how to install the product. The product can then be installed and the deployment engine 304 can thereafter identify changes that have occurred and track a current state, to perform actions based on the identified change (e.g., installation of additional products, check for new states, and the like).

The deployment system can also include a state evaluator component 306 that determines state of the tasks. In one example, the deployment document 309 can be analogized to a programming language (e.g., describing the system therein) and the deployment engine 304 is analogized to an interpreter and the state evaluator and the task handler can act as instructions. Accordingly, extensibility of the system becomes possible, and new behavior can be added to the deployment experience, wherein actions and metadata associated therewith can be readily updated. The workflow engine 312 can be a model-based transaction-oriented workflow engine that allows flexible deployment and configuration of applications and related components on multiple machines in a distributed networked environment. For example, state of the workflow engine 312 can be modeled and represented as relational entities and stored in the data store 311 (e.g., a SQL database).

In a related example, a workflow graph describing possible workflow execution paths required to deploy the desired set of software components can be modeled and encoded at a Meta-level, and is defined in terms of sets of precedence constraints, priorities and desired configuration states. The system 300 can define a domain-specific model for deploying and configuring server applications, an application associated with directory services, messaging systems, electronic messaging systems, operating systems, server monitoring software and/or applications, and the like. The precedence constraints in the model can define the order that tasks can be executed in. Employing precedence constraints enable multiple acts to be executed in parallel, which in turn, serves to reduce the total time for deployment. Tasks can be executed based on declared precedence constraints, wherein each precedence constraint can also define the required execution status of its predecessor acts. For instance, a task often utilizes parameters that can define a file path/name, server, user name or password. A task can have one or more parameters associated with it that are stored in the database. Parameters values can be communicated and shared between Tasks. Such allows the output filename for one task to be employed as the input filename for another task. A workflow can be executed many times. Each execution of a workflow can be persisted in the data store 312 (e.g., a SQL database in a Workflow executions table).

Figure 4:
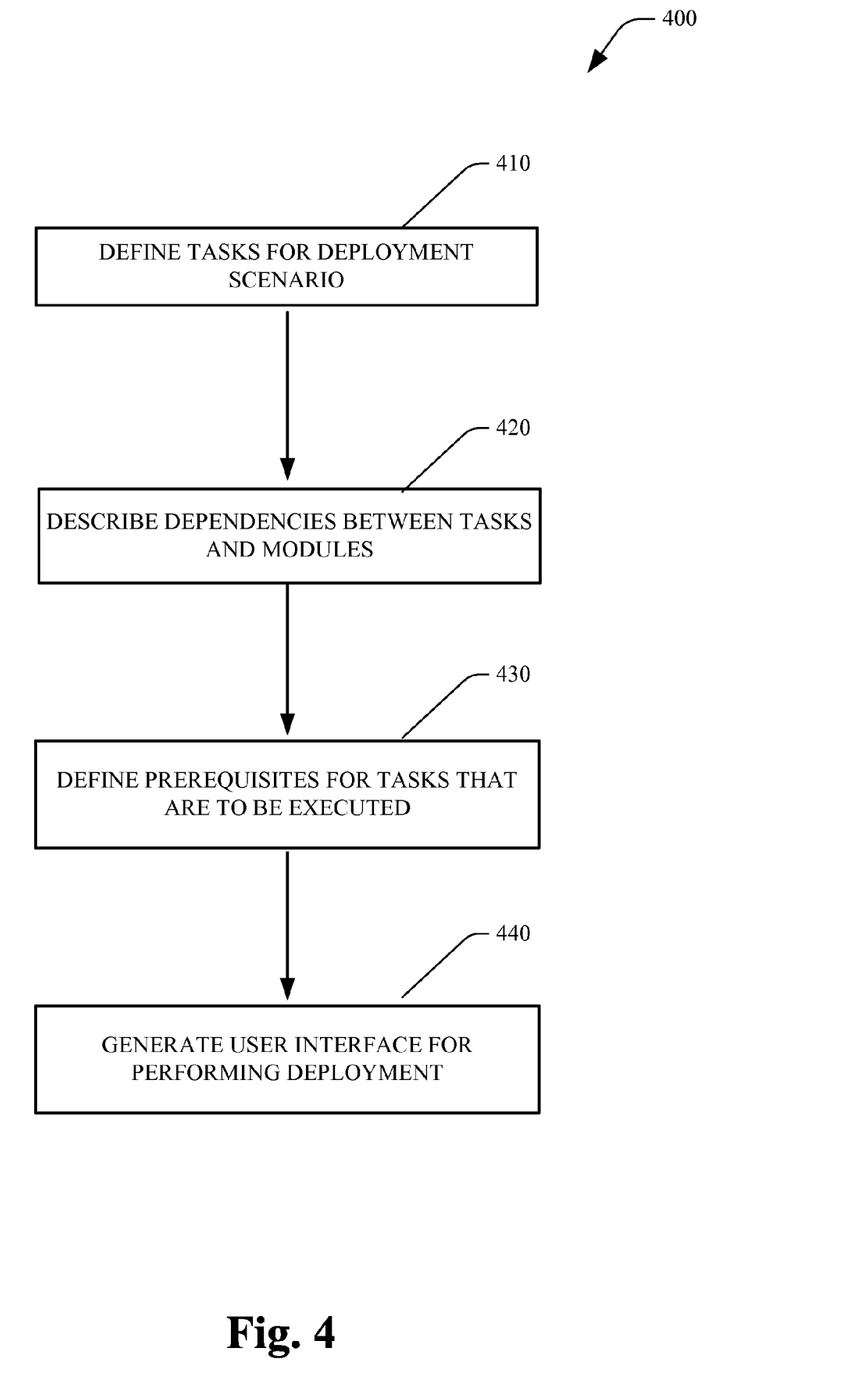
FIG. 4 illustrates a methodology of deploying a server application in accordance with an aspect of the subject innovation.

FIG. 4 illustrates a related methodology 400 of deploying applications in a distributed environment in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially, and at 410 tasks can be defined for a deployment scenario (e.g., mitigating a requirement for writing custom codes). Thereafter, and at 420 dependencies between task and modules can be described. Likewise, and at 430 the prerequisites for tasks that should be executed or installed are defined, and the state of tasks that should or should not be completed are designated. At 440, pre-requisites are enforced for tasks, wherein based on the document that defines the deployment scenario, a user interface for performing a deployment can be generated at 450.

Figure 5:
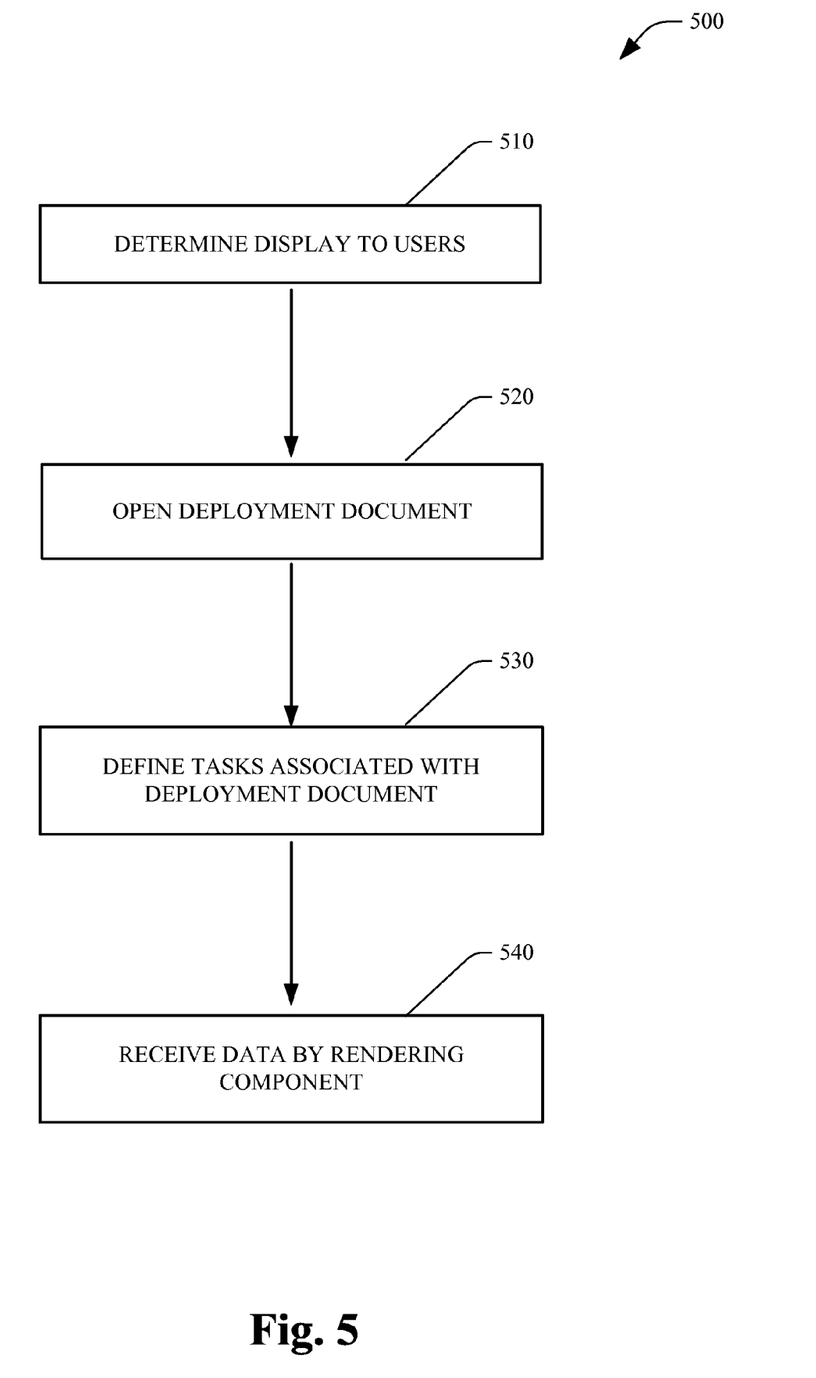
FIG. 5 illustrates a methodology of rendering a deployment document in accordance with an aspect of the subject innovation.

FIG. 5 illustrates a related methodology 500 of rendering a deployment document in accordance with an aspect of the subject innovation. Initially and at 510 a determination is made as to what should be displayed to a user via the rendering component. Next, and at 520 a request is made and the deployment document of the subject innovation is opened. Tasks associated with the deployment document can thereafter be defined at 530. Such information can then be forwarded to the rendering component at 540, wherein the rendering component obtains the XML for a display thereof to the user (in forms of an HTML, for example).

Figure 6:
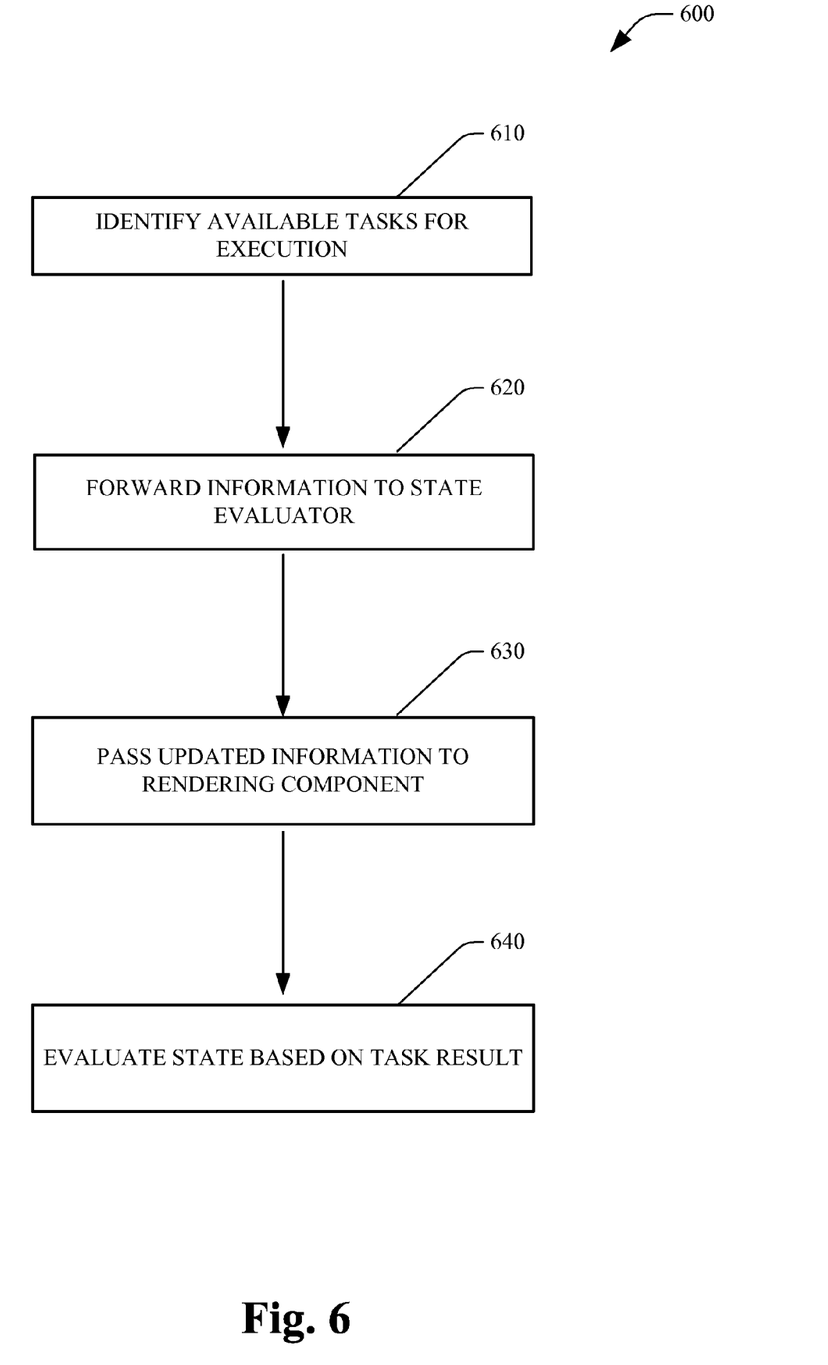
FIG. 6 illustrates a further methodology of application deployment according to an aspect of the subject innovation.

In a related methodology as illustrated in FIG. 6, at 610 the deployment engine identifies the available tasks for execution by returning to the deployment document, to request parts of the document that are relevant to the state of the task(s). Such information is then passed to the state evaluator at 620, which employs the information along with the state check to determine the state of the task. Accordingly, the information is passed back to the deployment engine again, which passes the updated information to the rendering component at 630. For example, if install is disabled then the rendering component typically needs to be informed so the rendering component can display a deactivated button (e.g., gray color.) Such interactions can repeat through each task on the page. A user can then interact with the page via a click on a button. Hence, the deployment engine can determine what the user clicked and using the information previously obtained from the deployment document, forwards the requisite information to the task handler for performing the task. A state can then be evaluated based on the task results at 640.

Figure 7:
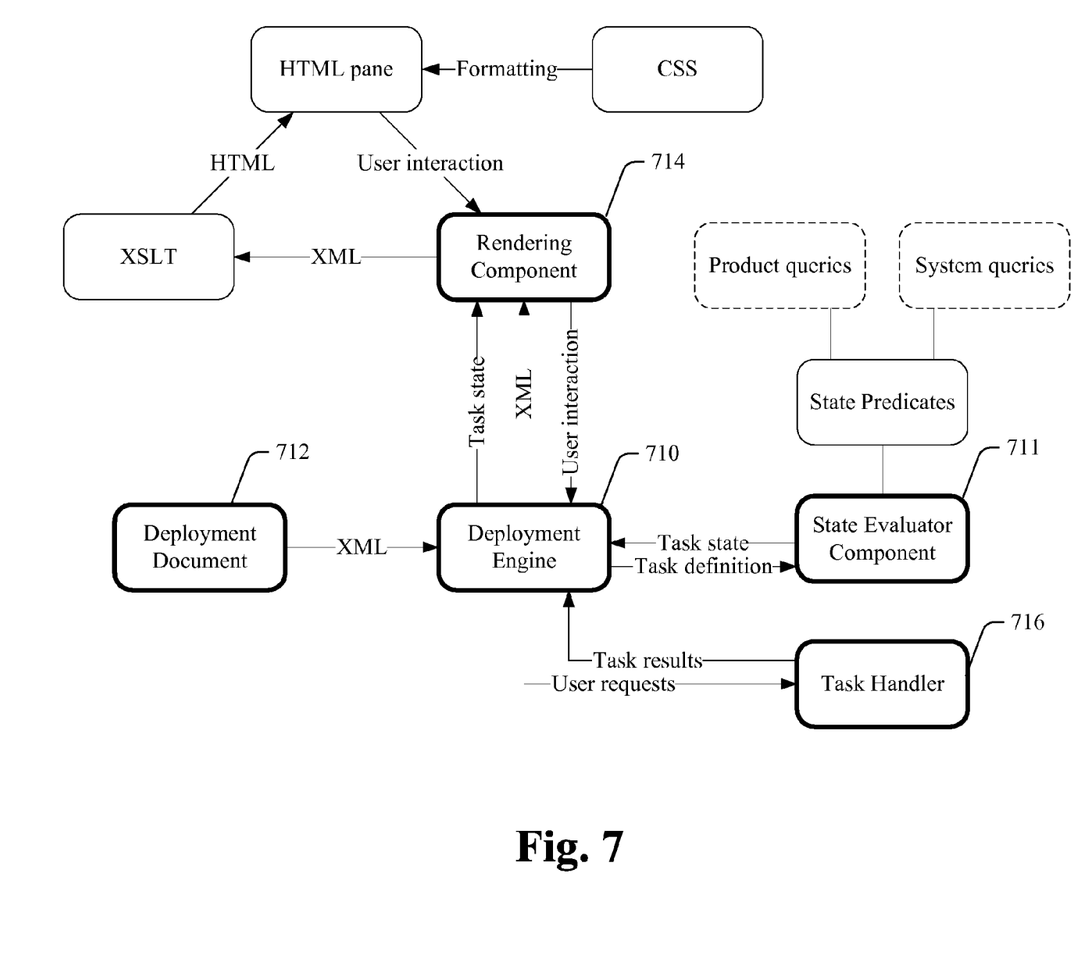
FIG. 7 illustrates an exemplary deployment system in accordance with an aspect of the subject innovation.
Figure 8:
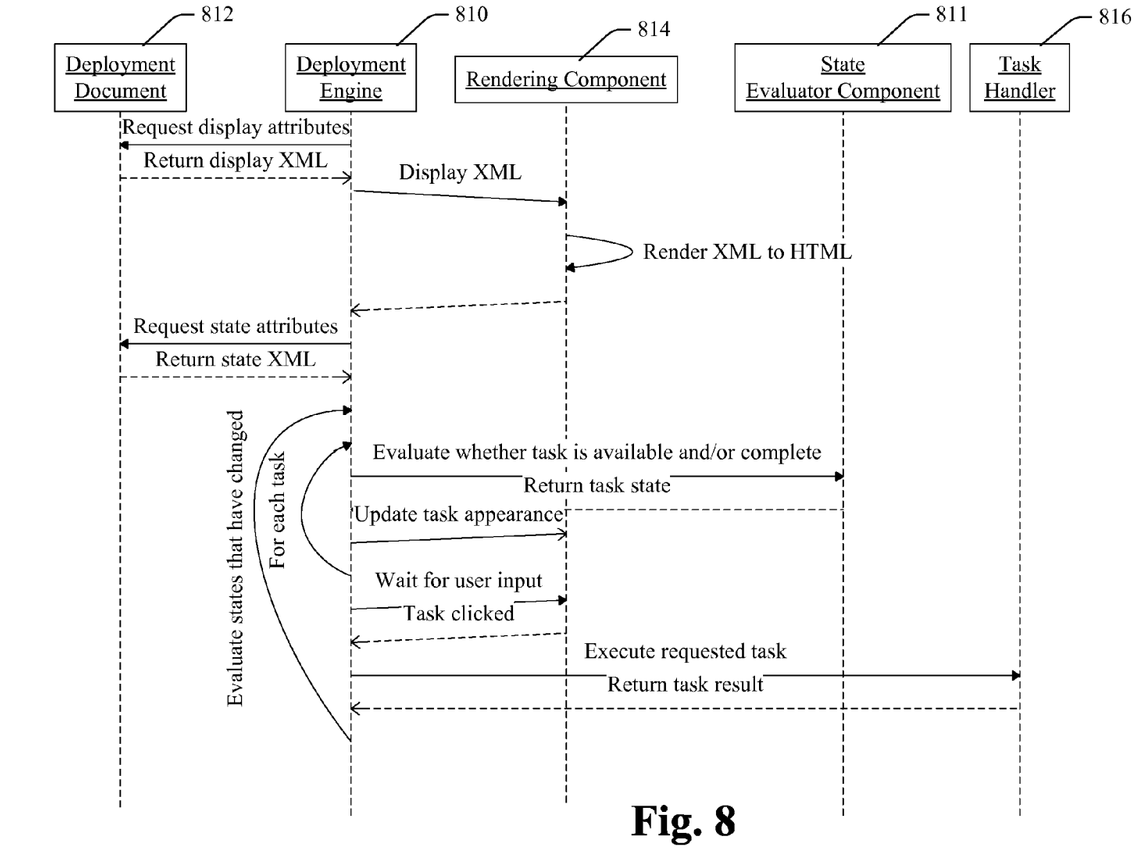
FIG. 8 illustrates exemplary actions among components of the subject innovation for deployment of server applications.

FIG. 7 and FIG. 8, as well as the following description relate to particular system architecture and a deployment methodology in accordance with an aspect of the subject innovation.

Deployment Engine 710, 810

The deployment engine 710, 810 can function as a shell within which all the other components reside and operate. When the deployment engine 710, 810 starts up, it can load the initial Deployment Document 712, 812 and build the GUI that surrounds the content pane provided by the rendering component 714, 814. In general, complex deployments can span many Deployment Documents, so the Deployment Engine 710, 810 maintains a stack of open documents and allows the user to navigate back to documents earlier in the stack.

After the Deployment Document 712, 812 is loaded by the Deployment Engine 710, 810, the contents of the document can then be passed to the rendering component, which can display the tasks available in the document. Hence, all tasks can be disabled. The Deployment Engine 710, 810 can subsequently iterate through the tasks defined by the Deployment Document 712, 812. Each task can have a number of predicates that collectively determine the state of the task—whether it is available, complete, and the like. Each of the predicates can be evaluated by the State Evaluator component 711, 811, and the resulting state can be transmitted back to the Rendering component 714, 814, which allows appropriate tasks to be enabled for use. At this point, the Deployment Engine 710, 810 can become idle and await user action. If the user chooses a task to execute, control is passed back to the Deployment Engine 710, 810, which makes a call into the Task Handler 716, 816 with information in the Deployment Document 712, 812 relevant to that particular task. When the task is complete, a result code can be returned. The Deployment Document 712, 812 can further define actions that occur upon particular results. Such actions can modify or invalidate state predicates, which can affect the availability of individual tasks. The task states can be re-evaluated by the State Evaluator component 711, 811, and their state is modified as appropriate.

Rendering Component 714, 814

Likewise, the rendering component 714, 814 can obtain the Deployment Document 712, 812 and perform appropriate actions that are required to layout and display a user interface exposing the tasks defined in the document. For example, such can occur by employing an XSLT transform on the XML document, with an HTML document as output. Such HTML document can then be loaded into an HTML document window and combined with a Cascading Style Sheets (CSS) document that defines the visual layout—fonts, colors, widths, and the like, for example. It is to be appreciated that HTML is just one form of output that can be produced, and other formats are well within the realm of the subject innovation (e.g., it is possible transform the metadata to XAML and presents the user interface in a Windows Presentation Framework—WPF-pane.)

State Evaluator Component 711, 811

Likewise, the state evaluator component 711, 811 is responsible for determining whether a task is available for the user to perform and what the tasks' appearance is in the UI. Exemplary states in the system can include: "Unavailable task" (preconditions have not been met, so the task is disabled); "Available task" (preconditions are met, yet task has not been completed); "Partially complete task" (needs to repeat the run to complete the action); "Completed task" (available to be run again); "Completed task"; unavailable for subsequent execution; "Error" (task was executed, but failed); "In progress" (task is currently being executed.) Moreover, the state of "Error" and "In progress" can be set by the actions of the Task Handler, and the remaining states can be calculated based on the definition of the <state> branch of the Deployment Document. The <state> element, as indicated in the deployment document infra, has two important attributes, namely; "repeatable"—wherein, a Boolean that indicates a task can be executed even if it is determined to be complete, and "showPartial", wherein a Boolean that indicates a task should be shown as partially complete if some but not all predicates are met.

Moreover, the Deployment Document can specify a number of predicates—functions that return Boolean values. Such predicates can optionally take one or more string parameters, and more complex predicates taking multiple parameters or typed parameters are also possible. The State Evaluator 711, 811 receives predicates from the XML Deployment Document 712, 812 as string name-value pairs indicating the name of the predicate and the value of the parameter for the predicate. In order to determine what function to call, the State Evaluator uses a common language runtime (e.g., Reflection) to query for available functions at runtime. Upon finding an appropriate predicate function, the State Evaluator 711, 811 checks to verify if such predicate has already been evaluated. Such can occur by maintaining a mapping from a (predicateName: string,parameterValue: string) tuple to a Boolean cached result. If this result is found, it is returned, to prevent the predicate from being repeatedly executed with the same input. Alternatively, and if a cached result is not found, the predicated can be executed, passing in the parameter. The result can then be stored in the cache and then returned. The cached results can be affected by the results of a task execution, as described in detail infra. In general, the State Evaluator can receive two types of predicates from the Deployment Document—<available> predicates and <complete> predicates. Such predicates can determine the overall state of the task. If any <available> predicate evaluates to false, the task is placed in a disabled state and a message indicating the reason is displayed in the UI. Likewise, if all <available> predicates evaluate to true, the task is set to an enabled state, pending any changes due to <completed> predicates. Furthermore, <completed> predicates can determine whether a task has been run to completion successfully or not. If all <completed> predicates for a given task evaluate to true, then the task is complete. In addition, if the repeatable attribute is set, the UI for state "Completed task" (available to be run again is) displayed, and if not, "Completed task" (unavailable for subsequent execution) can be employed. If none of the predicates evaluate to true, the "available task" (preconditions are met, task has not been completed) is employed.

Moreover, if the showPartial attribute is not set and some of the <complete> predicates evaluate to true, it behaves the same as if all the predicates evaluated to false, (available task—preconditions are met, task has not been completed). If the showPartial attribute is set, and at least one predicate that does not specify the nonPartial attribute evaluates to true, state of "Partially complete task" (needs to be run again to complete the action.) States that are required for a task to be complete but are not directly affected by the task in question should typically specify nonPartial, so that states modified by the task will result in a partially complete state in the UI.

Task Handler 716, 816

The task handler is the interface to the product specific actions that is executed during the deployment. In the metadata in the example provided infra, there exist two primary types of tasks in the deployment, such as: the msitask and the wizardtask, for example. It is to be appreciated that other types can be added as required. For example, the <msitask> is a task that launches the install of a windows installer packaged piece of software. Such can take as parameters the name of the window installer (MSI) to be installed and the GUID that identifies the piece of software to Windows Installer. Execution of this task is straightforward—the MSI is passed to Windows Installer with instructions to install. When it is complete, the cached value for the ProductInstalled(msiproduct) predicate is invalidated and removed from the cache. <msitask> has an implied <complete> predicate of ProductInstalled(msiproduct), so if the install succeeds, the task is marked complete, without any direct action required by the author of the Deployment Document. The <wizardtask> is a generalized method to launch any other action necessary for deployment. Such operates in a manner similar to Reflection, in that the routine to be executed is looked up by name and invoked. The difference between such approach and the predicates that are looked up by the State Evaluator is that the wizards are external to the Deployment Tool and may have been written for purposes other than expressly for the Deployment Tool. When a <wizardtask> has completed execution, it can return a value that indicates the result of that execution. As described in example infra, this value is an HRESULT. The result can have any number of values, which can coarsely be categorized into failed results such as E_FAIL or E_OUTOFMEMORY, successful results with warnings such as S_LC_SETUP_WIZARD_WARNING, or unconditional success: S_OK. The Deployment Document can specify a set of actions that are to be applied to the cache maintained by the State Evaluator when the task has completed execution. Such can be defined by the <onresult> elements in a task. Each <onresult> element can have a code attribute, which can be set to "success", "failure", "S_OK", or a specific HRESULT value of interest. When the task is complete, the appropriate <onresult> element is chosen for action. In the case of multiple matching <onresult> elements, for example S_OK would match code "S_OK" as well as code "success", the more specific code is used. Within the <onresult> element exists a series of <action> elements. Each <action> element can specify a predicate and parameter, which is used to locate the proper location in the State Evaluator's cache. It also specifies an action/verb such as "set", wherein the cached value is changed to true. If the action/verb is "clear", the cached value is set to false. If the verb is "invalidate", the cached value is discarded and will be recalculated the next time the State Evaluator is queried.

Deployment Bundle

The Deployment Bundle is a single file that encapsulates a complete set of Deployment Documents as well as all supporting files necessary for a deployment. This can include dynamically loadable binaries containing the modules specific to a product or deployment, such as the predicates used by the State Evaluator or the wizards launched by the TaskHandler. The Deployment Bundle can employ a container format such as cabinet files (CAB), which would allow for compression of the contained documents and modules, as well as cryptographic signatures to validate the contents of the bundle.

The following illustrates an exemplary deployment document in form of an XML;

```
<?xml version="1.0" encoding="utf-8" ?>
<?xml-stylesheet href="deploymentpage.xslt" type="text/xsl"?>
<setuppage
   xmlns:xsi=http://www.w3.org/2001/XMLSchema-instance
   xsi:noNamespaceSchemaLocation="deploymentpage.xsd"
   shorttitle="Web Components"
   longtitle="Deploy Web Components"
   subtitle="These tasks set up the Web components."
>
   <msitask counted="true">
      <id>install_webcomponents_task</id>
      <title>Install Files for Web Components</title>
      <hotkey>I</hotkey>
      <msifile>WebComponents.msi</msifile>
      <msiproduct>$(WEBCOMPONENTS_PRODUCT_ID_STR)
      </msiproduct>
      <description>
         Run locally.
      </description>
      <prereqs>
         <prereq>Local Administrator credentials</prereq>
      </prereqs>
      <help>
         <link target="40000050">Installing Web Components</link>
      </help>
      <state>
         <available
            state="IISinstalled"
            notAvailable="IIS must be installed before you install
Web Components."
         />
         <available
            state="!ServerRoleInstalled"
parameter="$(EDGESRV_LCSCMD_KEYWORD_STR)"
            notAvailable="Web Components cannot coexist with Edge
Server."
         />
         <available
            state="!ServerRoleInstalled" parameter="PROXY"
            notAvailable="Web Components cannot coexist with Proxy
Server."
         />
         <available
            state="!ProductInstalled"
parameter="$(MEDIATION_PRODUCT_ID_STR)"
            notAvailable="Web Components Server cannot coexist
with Mediation Server."
         />
      </state>
   </msitask>
   <wizardtask counted="true">
      <id>activate_webcomponents_task</id>
      <title>Activate Web Components</title>
      <hotkey>A</hotkey>
      <taskname>LCS_WIZARD_ACTIVATE_WEB_COMPONENTS
      </taskname>
      <description>
         Run on the server where Web Components are installed.
      </description>
      <prereqs>
         <prereq>
            RTCUniversalServerAdmins credentials and Domain Admins
credentials or
            equivalent credentials
         </prereq>
         <prereq>
            See the Deployment Series for more information about
installation by
            non-Domain Admins.
         </prereq>
```

```
        </prereqs>
        <help>
            <link target="40000051">Activating Web Components</link>
        </help>
        <state repeatable="false" notAvailable="Active Directory
must be prepped first.">
            <available state="SchemaPrepped"/>
            <available state="ForestPrepped"/>
            <available state="DomainPrepped"/>
            <available
                state="ProductInstalled"
parameter="$(WEBCOMPONENTS_PRODUCT_ID_STR)"
                notAvailable="Web Components must be installed before
they can be activated."
            />
            <complete state="WebActivated"      parameter="IM"
/>
        </state>
        <onresult code="success">
            <action verb="set"           state="WebActivated"
parameter="IM"       />
        </onresult>
        <onresult code="failure">
            <action verb="invalidate" state="WebActivated"
parameter="IM"       />
        </onresult>
    </wizardtask>
    <wizardtask counted="true">
        <id>validate_server_task</id>
        <title>Validate Web Components</title>
        <hotkey>V</hotkey>
        <taskname
            runningmode="FOR_LCS_SNAPIN"
            taskcontext="LC_TASK_WEBCOMP_CONTEXT"
        >Server.DiagnosticsUI</taskname>
        <description>
            Validates Web Components configuration and connectivity.
        </description>
        <prereqs>
            <prereq>RTCUniversalServerAdmins credentials</prereq>
        </prereqs>
        <help>
            <link target="10121530">Validating Web Components
Configuration</link>
        </help>
        <state
            notAvailable="Web Components must be installed and
activated before you can
                run Validate Web Components."
        >
            <available state="ProductInstalled"
parameter="$(WEBCOMPONENTS_PRODUCT_ID_STR)"       />
            <available state="WebActivated"      parameter="IM"
/>
        </state>
    </wizardtask>
</setuppage>
```

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
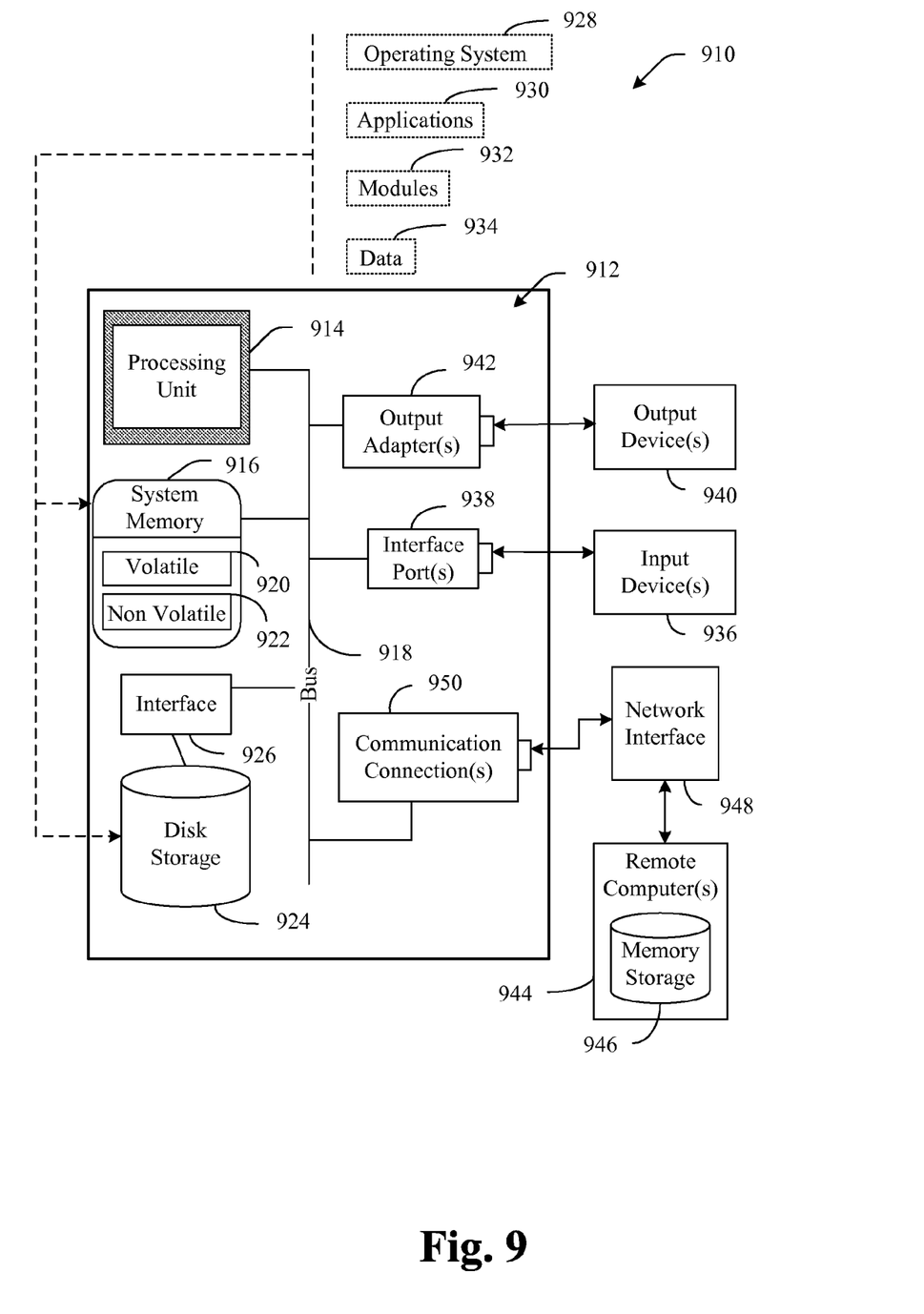
FIG. 9 illustrates an exemplary environment for implementing various aspects of the subject innovation.
Figure 10:
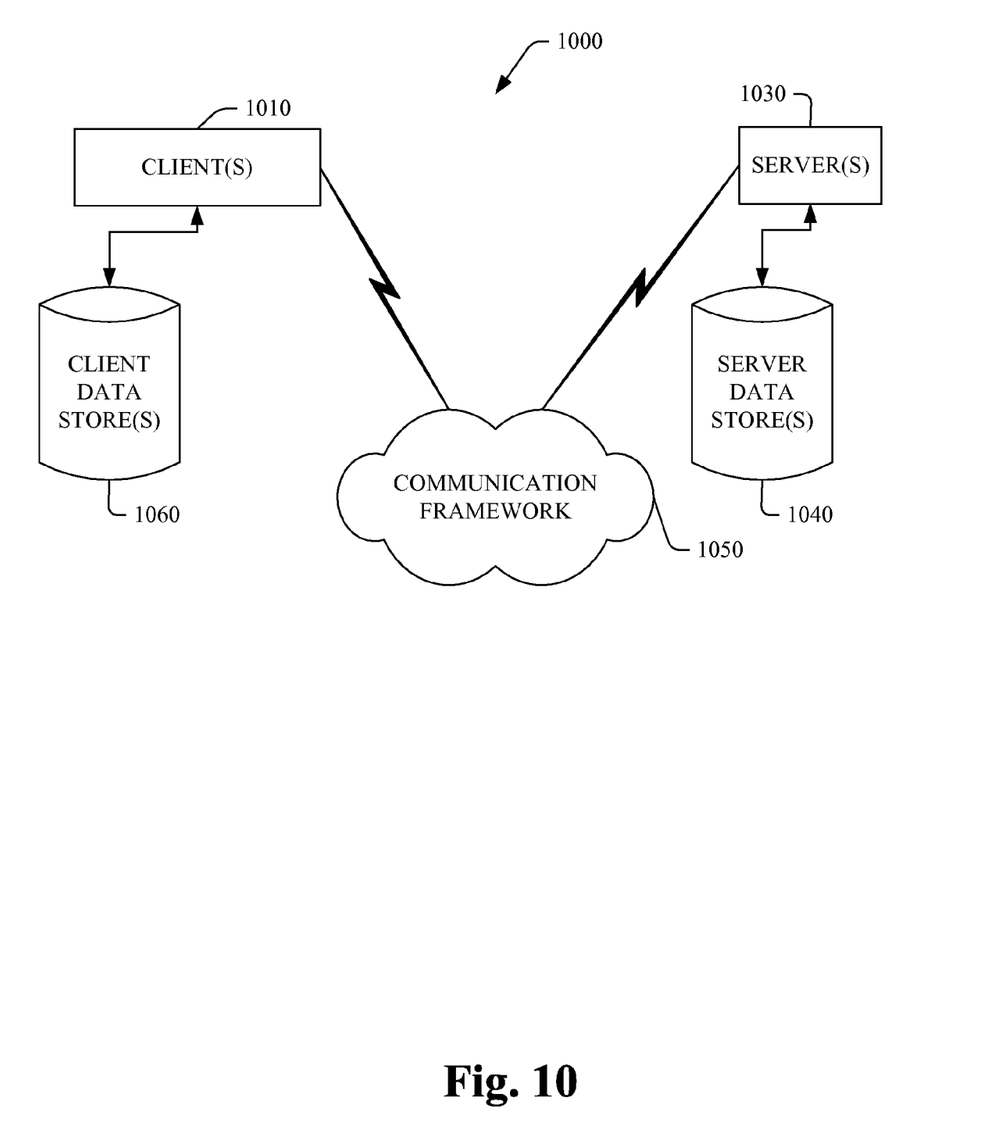
FIG. 10 illustrates a schematic block diagram of another sample-computing environment that can be employed for implementing a deployment system in accordance with an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing a deployment system in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
a processor configured to execute computer executable components; and
memory storing computer executable components including:
a deployment engine component configured to obtain tasks associated with deploying an application on one or more servers, predicates required to perform each task, and parameters for executing each task from a deployment document that declaratively defines deployment actions for the application;
a state evaluator component configured to receive the predicates required to perform each task from the deployment engine component, determine a state of each task by evaluating the predicates required to perform each task, and return the state of each task to the deployment engine component; and
a rendering component configured to receive the tasks and the state of each task from the deployment engine component, display the tasks in a user interface, update the appearance of each task in the user interface based on the state of each task, and return user input that selects a task displayed in the user interface to the deployment engine component, wherein the deployment engine component forwards the parameters for executing the selected task to a task handler when the state of the selected task indicates that the predicates required to perform the selected task have been satisfied.

2. The computer implemented system of claim 1, wherein the deployment document is editable to accommodate changing deployment requirements.

3. The computer implemented system of claim 2, wherein the deployment document is an Extensible Markup Language (XML) document.

4. The computer implemented system of claim 3, wherein the rendering component transforms metadata from the deployment document for display in the user interface as HyperText Markup Language (HTML).

5. The computer implemented system of claim 1, wherein the deployment engine component receives a deployment bundle that includes the deployment document and one or more modules specific to the application.

6. The computer implemented system of claim 1, wherein the state evaluator component provides a cache that stores values for evaluated predicates.

7. The computer implemented system of claim 6, wherein the deployment document specifies one or more actions to be applied to the cache when a task has completed execution.

8. The computer implemented system of claim 1, wherein the deployment document includes one or more predicates defined by a third party.

9. The computer implemented system of claim 1 further comprising a model based transaction oriented work flow engine.

10. A computer implemented method comprising computer executable acts including:
obtaining, by a deployment engine of a deployment system, tasks associated with deploying an application on one or more servers, predicates required to perform each task, and parameters for executing each task from a deployment document that declaratively defines deployment actions for the application;
receiving, by a renderer of the deployment system, the tasks from the deployment engine;
displaying, by the renderer, the tasks in a user interface;
receiving, by a state evaluator of the deployment system, the predicates required to perform each task from the deployment engine;
determining, by the state evaluator, a state of each task by evaluating the predicates required to perform each task;
returning, by the state evaluator, the state of each task to the deployment engine;
receiving, by the renderer, the state of each task from the deployment engine;
updating, by the renderer, the appearance of each task in the user interface based on the state of each task;
returning, by the renderer, user input that selects a task displayed in the user interface to the deployment engine; and
forwarding, by the deployment engine, the parameters for executing the selected task to a task handler when the state of the selected task indicates that the predicates required to perform the selected task have been satisfied.

11. The computer implemented method of claim 10, wherein the deployment document describes dependencies between tasks and modules of the application.

12. The computer implemented method of claim 10, wherein the deployment document defines one or more tasks that are to be executed for installing the application.

13. The computer implemented method of claim 10, wherein the deployment document defines one or more tasks that are to be executed after installation of the application.

14. The computer implemented method of claim 10 further comprising:
receiving, by the deployment engine, a deployment bundle including the deployment document and one or more modules specific to the application.

15. The computer implemented method of claim 10, wherein the deployment document includes one or more predicates defined by a third party.

16. The computer implemented method of claim 10 further comprising:
storing, by the state evaluator, values for evaluated predicates in a cache.

17. The computer implemented method of claim 16, wherein the deployment document specifies one or more actions to be applied to the cache when a task has completed execution.

18. A computer readable storage device storing computer executable instructions that, when executed, cause a computer to perform a method comprising:
obtaining, by a deployment engine of a deployment system, tasks associated with deploying an application on one or more servers, predicates required to perform each task, and parameters for executing each task from a deployment document that declaratively defines deployment actions for the application;
receiving, by a renderer of the deployment system, the tasks from the deployment engine;
displaying, by the renderer, the tasks in a user interface;
receiving, by a state evaluator of the deployment system, the predicates required to perform each task from the deployment engine;
determining, by the state evaluator, a state of each task by evaluating the predicates required to perform each task;
returning, by the state evaluator, the state of each task to the deployment engine;
receiving, by the renderer, the state of each task from the deployment engine;

updating, by the renderer, the appearance of each task in the user interface based on the state of each task;

returning, by the renderer, user input that selects a task displayed in the user interface to the deployment engine; and forwarding, by the deployment engine, the parameters for executing the selected task to a task handler when the state of the selected task indicates that the predicates required to perform the selected task have been satisfied.

19. The computer readable storage device of claim 18 further storing computer executable instructions for:

storing, by the state evaluator, values for evaluated predicates in a cache.

20. The computer readable storage device of claim 19, wherein the deployment document specifies one or more actions to be applied to the cache when a task has completed execution.

* * * * *